(12) United States Patent
Lee

(10) Patent No.: US 8,254,908 B2
(45) Date of Patent: Aug. 28, 2012

(54) SERVER AND METHOD FOR REMOTELY TESTING ELECTRONIC DEVICES

(75) Inventor: Chien-Hung Lee, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 407 days.

(21) Appl. No.: 12/564,726

(22) Filed: Sep. 22, 2009

(65) Prior Publication Data

US 2010/0275061 A1  Oct. 28, 2010

(30) Foreign Application Priority Data

Apr. 28, 2009 (CN) .......................... 2009 1 0301921

(51) Int. Cl.
*H04W 24/00* (2009.01)

(52) U.S. Cl. ........ 455/423; 455/419; 455/420; 455/557; 455/67.11; 714/27; 714/37; 714/38.1

(58) Field of Classification Search ........... 455/423–425
See application file for complete search history.

(56) References Cited

U.S. PATENT DOCUMENTS

| | | | |
|---|---|---|---|
| 7,024,161 B1 * | 4/2006 | LaMedica, Jr. ............ | 455/67.11 |
| 7,570,023 B2 * | 8/2009 | Hsu et al. ..................... | 320/132 |
| 8,049,461 B2 * | 11/2011 | Yu .................................. | 320/111 |
| 2003/0007191 A1 * | 1/2003 | Herbert ......................... | 358/462 |
| 2003/0028826 A1 * | 2/2003 | Balluff ............................ | 714/44 |
| 2004/0183543 A1 * | 9/2004 | Lan et al. ....................... | 324/511 |
| 2004/0257208 A1 * | 12/2004 | Huang et al. ................ | 340/426.1 |
| 2005/0192002 A1 * | 9/2005 | Varanda ......................... | 455/423 |
| 2005/0240837 A1 * | 10/2005 | Dubois et al. ................ | 714/712 |
| 2007/0139192 A1 * | 6/2007 | Wimberly et al. ........ | 340/539.22 |
| 2008/0200218 A1 * | 8/2008 | Bobst .............................. | 455/572 |

* cited by examiner

*Primary Examiner* — Jinsong Hu
*Assistant Examiner* — Magdi Elhag
(74) *Attorney, Agent, or Firm* — Altis Law Group, Inc.

(57) ABSTRACT

An agent server for remotely testing an electronic device is connected to the electronic device via a control interface. The control interface includes a direct power supply and a keyboard test device. The agent server receives test requirements sent from a client via a network, supplies power to a dummy of the electronic device using the direct power supply, so as to start up the electronic device. Furthermore, the agent server operates a keyboard of the electronic device according to the test requirements using the keyboard test device, so as to establish a communication between the electronic device and another electronic device. A video camera captures video and audio information of the electronic device during the communication, and transmits the video and audio information to the client. The client analyzes the video and audio information to determine a test result of the electronic device.

14 Claims, 3 Drawing Sheets

SERVER AND METHOD FOR REMOTELY TESTING ELECTRONIC DEVICES

BACKGROUND

1. Technical Field

Embodiments of the present disclosure are related to electronic device test methods, and particularly to a server and method for remotely testing electronic devices.

2. Description of Related Art

Different types of mobile phones may have differences in hardware configuration. Furthermore, network environments in the same zone constructed by different mobile phone network providers may be different, and network environments in different zones constructed by the same mobile phone network provider may also be different. As a result, compatibility problems often occur when using mobile phones, thus compatibility testing of mobile phones is essential. Presently, compatibility tests are spot tests, which requires test engineers to go to particular zones where it is anticipated the phones will be used.

DETAILED DESCRIPTION

All of the processes described may be embodied in, and fully automated via, functional code modules executed by one or more general purpose computers or processors. The code modules may be stored in any type of computer-readable medium or other storage device. Some or all of the methods may alternatively be embodied in specialized computer hardware or electronic apparatus.

Figure 1:
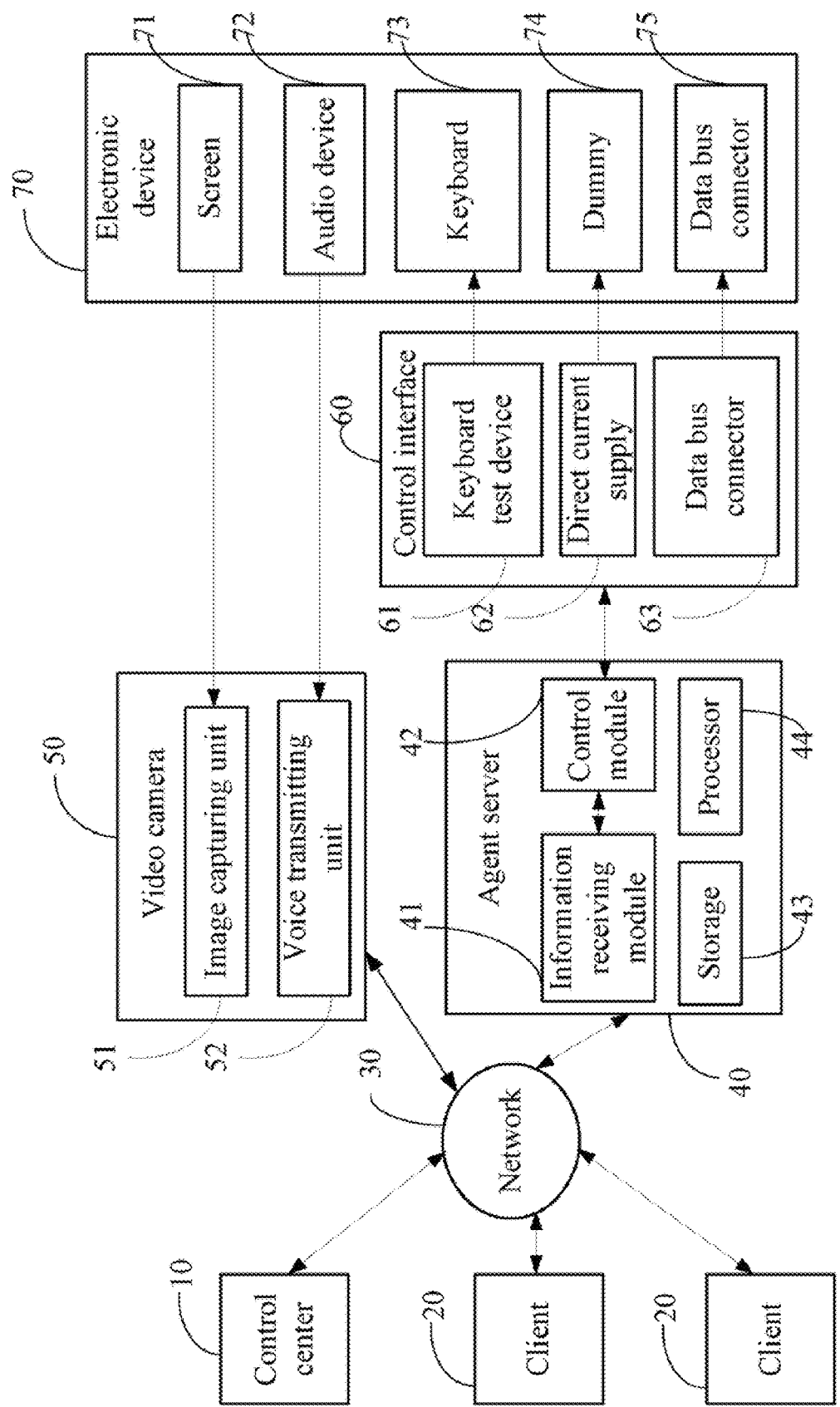
FIG. 1 is a block diagram of one embodiment of an agent server for remotely testing one or more electronic devices.

FIG. 1 is a block diagram of one embodiment of an agent server 40 for remotely testing one or more electronic devices 70 (only one is shown). In one embodiment, the agent server 40 may be connected to a control center 10 and one or more clients 20 (only two are shown) via a network 30. The one or more clients 20 are further connected to at least one video camera 50 via the network 30. The agent server 40 is connected to the one or more electronic devices 70 via a control interface 60. Each of the electronic devices 70 may be a mobile phone, a personal digital assistant, or any other suitable electronic device.

In one embodiment, the control center 10 stores information on the agent server 40, such as a geographical position, and port and protocol information of the agent server 40. The control center 10 also stores information on the one or more electronic devices 70, such as a type, a geographical position, hardware and software configuration, and updated software of each electronic device 70.

In one example, a client 20 selects an electronic device 70 to be tested via the control center 10, and sends test requirements to the agent server 40 via the network 30. For example, the test requirements may include a request to engage in video communication with a mobile phone, a number of the mobile phone, and a calling instruction. Alternatively, the test requirements may include a request to send a short message to the mobile phone, the number of the mobile phone, short message content, and a short message sending instruction. It may be understood that the client 20 may select more than one electronic device 70 positioned in the same geographical area at one time.

The agent server 40 includes a requirement receiving module 41 and a control module 42. The requirement receiving module 41 receives the test requirements from the client 20, and the control module 42 controls the control interface 60 to operate the selected electronic device 70 according to the test requirements. Computerized codes of the requirement receiving module 41 and the control module 42 are stored in a storage 43, and a processor 44 of the agent server 40 executes the computerized codes to provided the above mentioned functions of the two modules.

The control interface 60 includes a keyboard test device 61, a direct current supply 62, and a data bus connector 63. The electronic device 70 includes a screen 71, an audio device 72, a keyboard 73, a dummy 74, and a data bus connector 75.

After receiving the test requirements from the client 20, the control interface 60 supplies power to the dummy 74 to start up the selected electronic device 70 via the direct power supply 62, simulates keystroke signals from the keyboard 73 via the keyboard test device 61, so as to establish a communication between the selected electronic device 70 and the mobile phone. If the selected electronic device 70 suddenly halts during the communication, the direct power supply 62 interrupts power to the dummy 74 for a short time, such as 3 seconds, to allow the selected electronic device 70 to restart. Many conditions may bring halting of the selected electronic device 70, for example, severe vibration of a platform where the selected electronic device 70 is positioned may cause the halting.

Figure 2:
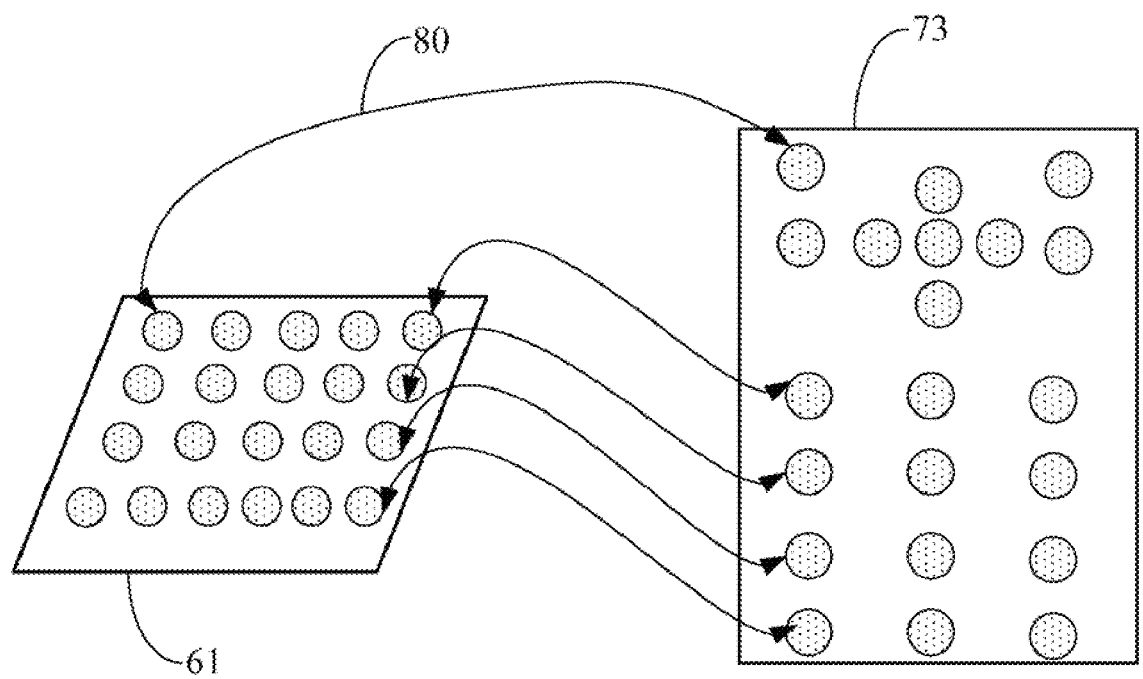
FIG. 2 illustrates a connection between a keyboard test device and a keyboard of an electronic device in FIG. 1.

In one embodiment, the keyboard test device 61 is a simplified circuit board, which uses a plurality of conducting wires 80 to connect ports of keys (hereinafter "key ports") on the keyboard 73 with ports on the keyboard test device 61. As shown in FIG. 2, the keyboard 73 includes 21 keys, and each conducting wire 80 (only five conducting wires 80 are shown) connects a key port with a port on the keyboard test device 61. The keyboard test device 61 can then initiate a corresponding keystroke signal by causing a short-circuit event between two connected ports of a corresponding electronic circuit, such as the electronic circuit between a port of a number key "1" and a port on the keyboard test device 61 connected by a conducting wire 80. As a result, the key (e.g., the number key "1") is triggered even though the key has not been pressed. Accordingly, a corresponding function of the selected electronic device 70 is triggered, such as inputting information (e.g., inputting the number 1), automatically dialing a phone number, or sending a message, for example.

The video camera 50 includes an image capturing unit 51 and a voice transmitting unit 52. During the communication between the selected electronic device 70 and the mobile phone, the image capturing unit 51 captures video information displayed on the screen 71 of the selected electronic device 70, and the voice transmitting unit 52 records audio information sent from the audio device 72 of the selected electronic device 70. In one embodiment, the image capturing unit 51 may be a complementary metal oxide semiconductor (CMOS) or a charge coupled device (CCD). The voice transmitting unit 52 includes a microphone. The audio device may be an earphone or a microphone.

Furthermore, the video camera 50 transmits the video and audio information to the control center 10 and the client 20. The client 20 analyzes the video and audio information to determine a test result of the selected electronic device 70, and transmits the test result to the control center 10. Therefore, the control center 10 can acquire test results of all of the selected electronic devices 70. In one embodiment, if the communication is a video communication between the selected electronic devices 70 and the electronic device, the test result includes a video effect and a audio effect, and whether the video effect and audio effect satisfies a predetermined standard. If the communication is sending a short message to the mobile phone, the test result includes whether the short message has been sent successfully, which also can be determined according to the video and audio information of the selected electronic device.

If the video effect and audio effect does not satisfy the predetermined standard, or the short message has not been sent successfully, which means the selected electronic device 70 fails the test, the client 20 analyzes the hardware and software configuration of the selected electronic device 70, to determine a cause of failure. If the cause of failure is hardware related, the client 20 determines the hardware needs to be updated. Otherwise, if the cause of failure is software related. For example, an application program may have compatibility problems with a network in a certain geographical zone, where the selected electronic device 70 will be used, then the client 20 sends an updated version of the application program to the agent server 40 via the network 30. Furthermore, the agent server 40 transmits the updated version of the application program to the selected electronic device 70 via the data bus connector 63 and the data bus connector 75, to enable the selected electronic device 70 to install the updated version of the application program.

Figure 3:
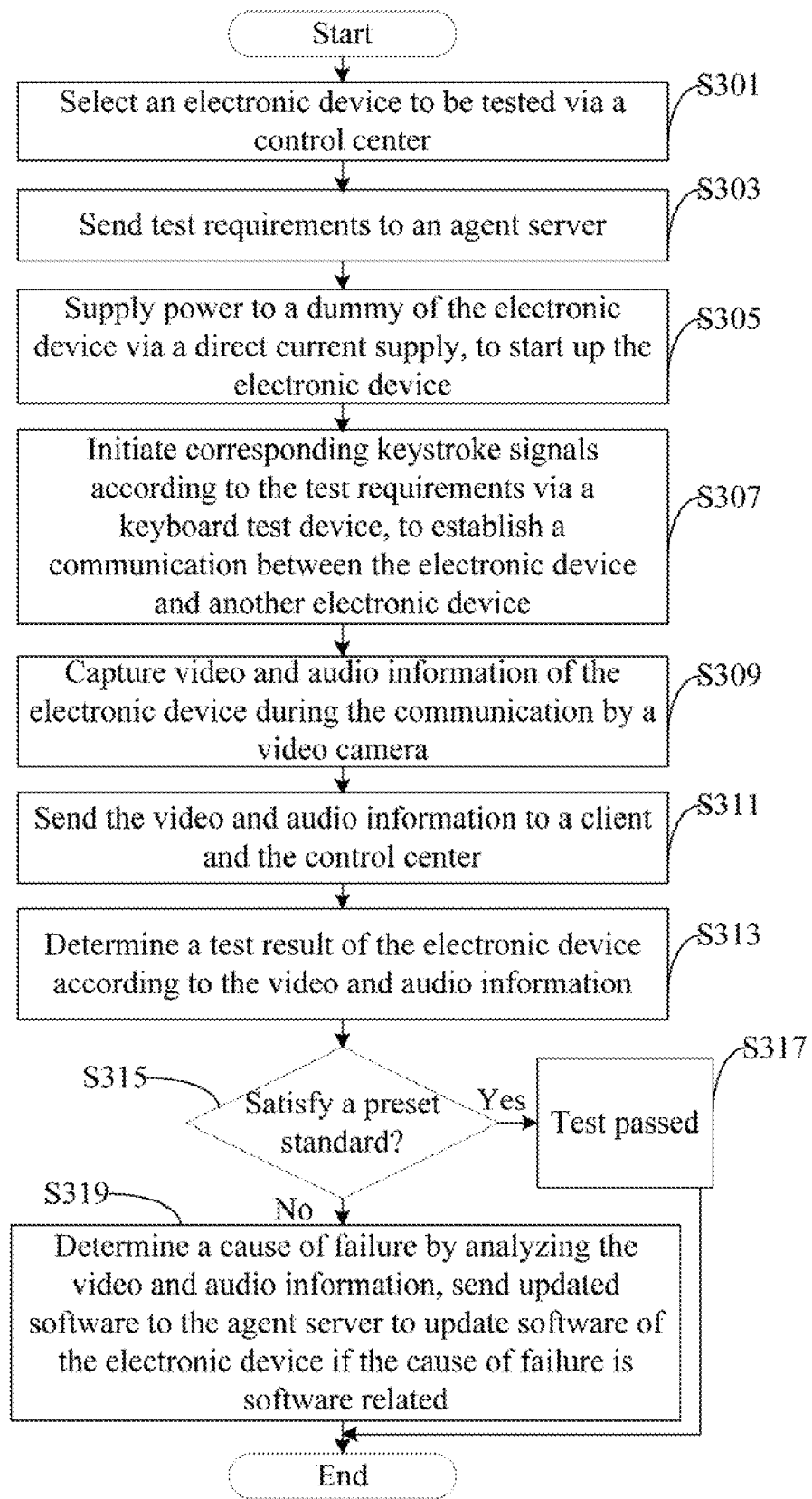
FIG. 3 is a flowchart of one embodiment of a method for remotely testing the one or more electronic devices in FIG. 1.

FIG. 3 is a flowchart of one embodiment of a method for remotely testing the one or more electronic devices 70 in FIG. 1. Depending on the embodiment, additional blocks may be added, others removed, and the ordering of the blocks may be changed.

In block S301, a client 20 selects an electronic device 70 to be tested via the control center 10. For example, the client 20 may be positioned in Taipei, but the selected electronic device 70 may be positioned in Shenzhen.

In block S303, the client 20 sends test requirements to the agent server 40 via the network 30. In this embodiment, the test requirements may include a request to engage in video communication with a mobile phone, a number of the mobile phone, and a dialing instruction.

In block S305, the control interface 60 receives the test requirements from the client 20, and supplies power to the dummy 74 of the selected electronic device 70 via the direct power supply 62.

In block S307, the control interface 60 simulates keystroke signals from the keyboard 73 via the keyboard test device 61 according to the test requirements, so as to establish the video communication between the selected electronic device 70 and the mobile phone. If the selected electronic device 70 suddenly halts during the communication, the direct power supply 62 interrupts power to the dummy 74 for a short time, such as 3 seconds, so as to restart the selected electronic device 70. As mentioned above, the keyboard test device 61 is a simplified circuit board, which uses a plurality of conducting wires 80 to connect key ports on the keyboard 73 with ports on the keyboard test device 61. As shown in FIG. 2, the keyboard 73 includes 21 keys, and each conducting wire 80 (only five conducting wires 80 are shown) connects a key port and a port on the keyboard test device 61. The keyboard test device 61 can then initiate a corresponding keystroke signal by causing a short-circuit event between two connected ports of a corresponding electronic circuit, such as the electronic circuit between a port of a number key "1" and a port on the keyboard test device 61 connected by a conducting wire 80. As a result, the key (e.g., the number key "1") is triggered even though the key has not been pressed. Accordingly, corresponding functions of the selected electronic device 70 can be triggered, such as automatically dialing a phone number "134****8899" in sequence.

In block S309, during the communication between the selected electronic device 70 and the mobile phone, the image capturing unit 51 captures video information displayed on the screen 71 of the selected electronic device 70, and the voice transmitting unit 52 records audio information sent from the audio device 72 of the selected electronic device 70.

In block S311, the video camera 50 transmits the video and audio information to the control center 10 and the client 20 via the network 30.

In block S313, the client 20 determines a test result of the selected electronic device 70 by analyzing the video and audio information. In one embodiment, the test result includes a video effect and an audio effect.

In block S315, the client 20 determines whether the video effect and audio effect satisfies a predetermined standard, such as a predetermined video effect and audio effect. If the video effect and audio effect satisfies the predetermined standard, in block S317, the client 20 determines that the selected electronic device 70 passes the test. Otherwise, if the video effect and audio effect does not satisfies the predetermined standard, the procedure goes to block S319.

In block S319, the client 20 determines a cause of failure by analyzing the hardware and software configuration of the selected electronic device 70. If the cause of failure is hardware related, the client 20 determines the hardware needs to be updated. Otherwise, if the cause of failure is software related. For example, an application program may have compatibility problems with a network in a certain geographical zone, where the selected electronic device 70 will be used, then the client 20 sends an updated version of the application program to the agent server 40 via the network 30. Furthermore, the agent server 40 transmits the updated version of the application program to the selected electronic device 70 via the data bus connector 63 and the data bus connector 75, to enable the selected electronic device 70 to install the updated version of the application program.

It should be emphasized that the above-described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be included herein within the scope of this disclosure and the above-described inventive embodiments, and the present disclosure is protected by the following claims.

What is claimed is:

1. An agent server for remotely testing one or more electronic devices, the agent server communicating with a control center and one or more clients via a network, the agent server comprising:

a storage;

at least one processor; and one or more programs stored in the storage to be executed by the at least one processor, the one or more programs comprising:

an information receiving module operable to receive test requirements of a test for a selected electronic device sent from a client, wherein the test requirements comprise a request to engage in video communication with a second electronic device, a number of the second electronic device, and a calling instruction; and a control module operable to control a control interface that connects the agent server and the selected electronic device, to operate a keyboard of the selected electronic device according to the test requirements, so as to establish the video communication, wherein the control interface comprises:
    a direct current supply operable to supply power to a dummy of the selected electronic device, to start up the selected electronic device;
    a keyboard test device operable to simulate keystroke signals from the keyboard of the selected electronic device, so as to establish the communication between the selected electronic device and the second electronic device, wherein the keyboard test device is a simplified circuit board that uses a plurality of conducting wires to connect each key port on the selected electronic device and a port on the keyboard test device, and initiates a corresponding keystroke signal by causing a short-circuit event between two connected ports of a corresponding conducting wire; and
    a data bus connector operable to update corresponding software of the selected electronic device, in response that the failure cause of the test is software related; and
the client operable to receive video and audio information of the selected electronic device captured by a video camera during the video communication, determine whether the selected electronic device passes the test by determining if the video and audio information satisfies a predetermined standard, and analyze hardware and software configuration of the selected electronic device stored in the control center, to determine a failure cause of the test if the video and audio information does not satisfy the predetermined standard.

2. The agent server of claim 1, wherein the video camera captures the video information displayed on a screen of the selected electronic device, and captures the audio information sent from an audio device of the selected electronic device during the communication.

3. The agent server of claim 1, wherein the control center stores a type, a geographical position, the hardware and software configuration, and updated software of the selected electronic device.

4. The agent server of claim 1, wherein the direct power supply interrupts the power supplied to the dummy for a short time if the selected electronic device suddenly halts during the communication, so as to restart the selected electronic device.

5. A method for remotely testing one or more electronic devices using an agent server, the agent server communicating with a control center and one or more clients via a network, the method comprising:
    sending test requirements of a test for a selected electronic device by a client, wherein the test requirements comprise a request to engage in video communication with a second electronic device, a number of the second electronic device, and a calling instruction;
    receiving the test requirements by the agent server, and supplying power to a dummy of the selected electronic device by a direct current supply of a control interface that connects the agent server and the selected electronic device, so as to start up the selected electronic device;
    operating a keyboard of the selected electronic device according to the test requirements by a keyboard test device of the control interface, so as to establish the video communication between the selected electronic device and the second electronic device, wherein the keyboard test device is a simplified circuit board that uses a plurality of conducting wires to connect each key port on the selected electronic device and a port on the keyboard test device, and initiates a corresponding keystroke signal by causing a short-circuit event between two connected ports of a corresponding conducting wire;
    capturing video information displayed on a screen of the selected electronic device, and audio information sent from an audio device of the selected electronic device during the video communication by a video camera;
    transmitting the video information and audio information to the client; and
    determining whether the selected electronic device passes the test by determining if the video and audio information satisfies a predetermined standard.

6. The method of claim 5, further comprising:
interrupting the power supplied to the dummy for a short time if the selected electronic device suddenly halts during the communication, so as to restart the selected electronic device.

7. The method of claim 5, further comprising:
analyzing hardware and software configuration of the selected electronic device stored in the control center, to determine a failure cause of the test if the video and audio information does not satisfy the predetermined standard.

8. The method of claim 7, further comprising:
updating corresponding software of the selected electronic device via a data bus connector of the control interface, in response that the failure cause of the test is software related.

9. The method of claim 5, wherein the control center stores a type, a geographical position, the hardware and software configuration, and updated software of the selected electronic device.

10. A non-transitory storage medium storing a set of instructions, the set of instructions capable of being executed by a processor to perform a method for remotely testing one or more electronic devices using an agent server, the agent server communicating with a control center and one or more clients via a network, the method comprising:
    sending test requirements of a test for a selected electronic device by a client, wherein the test requirements comprise a request to engage in video communication with a second electronic device, a number of the second electronic device, and a calling instruction;
    receiving the test requirements by the agent server, and supplying power to a dummy of the selected electronic device by a direct current supply of a control interface that connects the agent server and the selected electronic device, so as to start up the selected electronic device;
    operating a keyboard of the selected electronic device according to the test requirements by a keyboard test device of the control interface, so as to establish the video communication between the selected electronic device and the second electronic device, wherein the keyboard test device is a simplified circuit board that uses a plurality of conducting wires to connect each key port on the selected electronic device and a port on the keyboard test device, and initiates a corresponding keystroke signal by causing a short-circuit event between two connected ports of a corresponding conducting wire;
    capturing video information displayed on a screen of the selected electronic device, and audio information sent from an audio device of the selected electronic device during the video communication by a video camera;

transmitting the video information and audio information to the client; and determining whether the selected electronic device passes the test by determining if the video and audio information satisfies a predetermined standard.

11. The storage medium of claim 10, wherein the method further comprises:

interrupting power supplied to the dummy for a short time if the selected electronic device suddenly halts during the communication, so as to restart the selected electronic device.

12. The storage medium of claim 10, wherein the method further comprises:

analyzing hardware and software configuration of the selected electronic device stored in the control center, to determine a failure cause of the test if the video and audio information does not satisfy the predetermined standard.

13. The storage medium of claim 12, wherein the method further comprises:

updating corresponding software of the selected electronic device via a data bus connector of the control interface, in response that the failure cause of the test is software related.

14. The storage medium of claim 10, wherein the control center stores a type, a geographical position, hardware and software configuration, and updated software of the selected electronic device.

* * * * *